United States Patent
Jeyaraman et al.

(10) Patent No.: US 7,783,758 B1
(45) Date of Patent: Aug. 24, 2010

(54) METHOD AND APPARATUS FOR INCREASING THE EFFICIENCY OF TRANSACTIONS AND CONNECTION SHARING IN AN ENTERPRISE ENVIRONMENT

(75) Inventors: Thulasiraman Jeyaraman, San Jose, CA (US); Mark W. Hapner, San Jose, CA (US); Vladimir Matena, Redwood City, CA (US); Linda DeMichiel, Los Altos, CA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 12/038,525

(22) Filed: Feb. 27, 2008

Related U.S. Application Data (62) Division of application No. 09/800,403, filed on Mar. 5, 2001, now abandoned.

(60) Provisional application No. 60/230,493, filed on Sep. 6, 2000.

(51) Int. Cl.
G06F 15/173 (2006.01)
G06F 15/16 (2006.01)

(52) U.S. Cl. .................................... 709/225; 709/227

(58) Field of Classification Search ................ 709/225, 709/227
See application file for complete search history.

(56) References Cited

U.S. PATENT DOCUMENTS

| | | | |
|---|---|---|---|
| 5,241,675 A | 8/1993 | Sheth et al. | |
| 5,261,089 A | 11/1993 | Coleman et al. | |
| 5,363,505 A | 11/1994 | Maslak et al. | |
| 5,504,899 A | 4/1996 | Raz | |
| 5,504,900 A | 4/1996 | Raz | |
| 5,546,582 A | 8/1996 | Brockmeyer et al. | |
| 5,553,242 A | 9/1996 | Russell et al. | |
| 5,796,605 A * | 8/1998 | Hagersten ................... 700/5 |
| 6,046,983 A * | 4/2000 | Hasegawa et al. ........ 370/236.1 |
| 6,061,708 A | 5/2000 | McKeehan et al. | |

(Continued)

FOREIGN PATENT DOCUMENTS

EP 0457116 11/1991

(Continued)

OTHER PUBLICATIONS

Samaras et al., "Two-Phase Commit Optimizations and Tradeoffs in the Commercial Environment," IEEE, Apr. 1993.

Primary Examiner—Vivek Srivastava
Assistant Examiner—Thomas Duong
(74) Attorney, Agent, or Firm—Gregory P. Durbin; Polsinelli Shughart PC (57) ABSTRACT

Methods and apparatus for improving the overall performance of a system which processes transactions and provides connections in an enterprise environment are disclosed. According to one aspect of the present invention, a method for processing a transaction in an enterprise environment includes receiving a request to start the transaction, storing information which indicates that the request to start the transaction was received, and accessing a first resource manager associated with the transaction. Typically, a container receives the request to start a transaction from a component such as an enterprise bean. Once the first resource is accessed, the transaction is initiated as a local transaction on the first resource manager, and, eventually, the transaction is completed. In one embodiment, completing the transaction includes using a local transaction mechanism of the first resource manager to complete the local transaction.

14 Claims, 10 Drawing Sheets

U.S. PATENT DOCUMENTS

| | | | |
|---|---|---|---|
| 6,141,679 A | 10/2000 | Schaefer et al. | |
| 6,157,927 A | 12/2000 | Schaefer et al. | |
| 6,243,737 B1 | 6/2001 | Flanagan et al. | |
| 6,286,004 B1 | 9/2001 | Yoshiura et al. | |
| 6,295,548 B1 | 9/2001 | Klein et al. | |
| 6,332,165 B1 | 12/2001 | Hagersten et al. | |
| 6,351,795 B1 | 2/2002 | Hagersten | |
| 6,453,354 B1 * | 9/2002 | Jiang et al. | 709/229 |
| 6,493,774 B2 * | 12/2002 | Suzuki et al. | 710/100 |
| 6,671,686 B2 | 12/2003 | Pardon et al. | |
| 6,754,657 B2 | 6/2004 | Lomet | |
| 2006/0069723 A1 * | 3/2006 | Ferwerda et al. | 709/203 |

FOREIGN PATENT DOCUMENTS

| | | |
|---|---|---|
| EP | 0684569 | 11/1995 |
| EP | 0817095 | 1/1998 |

\* cited by examiner

METHOD AND APPARATUS FOR INCREASING THE EFFICIENCY OF TRANSACTIONS AND CONNECTION SHARING IN AN ENTERPRISE ENVIRONMENT

CROSS-REFERENCE TO RELATED APPLICATIONS

This application is a divisional patent application of and claims priority to co-pending U.S. patent application Ser. No. 09/800,403, filed Mar. 5, 2001 and entitled "Method and Apparatus for Increasing the Efficiency of Transactions and Connection Sharing in an Enterprise Environment"; which claims the benefit of U.S. Provisional Patent Application No. 60/230,493, filed Sep. 6, 2000 and entitled "Method and Apparatus for Increasing the Efficiency of Transactions and Connection Sharing in an Enterprise Environment"; both of which are hereby incorporated herein in their entireties.

BACKGROUND OF THE INVENTION

1. Field of Invention

The present invention relates generally to enterprise environments. More particularly, the present invention relates to substantially optimizing the efficiency of local transactions and connection sharing, both individually and in combination, within an enterprise environment.

2. Description of the Related Art

The Java 2 Platform, Enterprise Edition (J2EE) is an industry-standard general purpose platform for the development of enterprise business applications. The enterprise business applications developed for J2EE include transaction processing applications, such as purchase order management, for processing transactions on Internet servers. The application logic of these applications is typically implemented as components, particularly as Enterprise JavaBeans (EJB) components. EJB is the application component model of the J2EE platform. One of the key advantages of the BIB component model is that it is relatively easy for application developers to design and implement EJB applications. In addition, as the EJB is a popular industry standard, there are a number of already existing powerful application development tools that further simplify the development of EJB applications.

In general, an EJB component model is a component architecture for the development and the deployment of object-oriented, distributed, enterprise-level applications. An application developed using the BIB component model is scalable and transactional, and is typically portable across multiple platforms, which enables an EJB component to effectively be "written once" and "used substantially anywhere." That is, EJB components may also be used by multiple applications, i.e., EJB components may be shared or reused. As will be understood by those skilled in the art, the EJB component model enables application development to be simplified due, at least in part, to the fact that typically difficult programming problems are implemented by an EJB container, and not the application.

Typically, transactions within an enterprise environment are either global or local. For a global transaction, more than a single resource manager is used during the transaction. Alternatively, for a local transaction, only a single resource manager is used during a transaction. A resource manager, as will be appreciated by those skilled in the art, is a module that effectively manages a set or resources or data. Hence, the resource manager may be associated with databases, file systems, and substantially any suitable enterprise environment resources.

Figure 1:
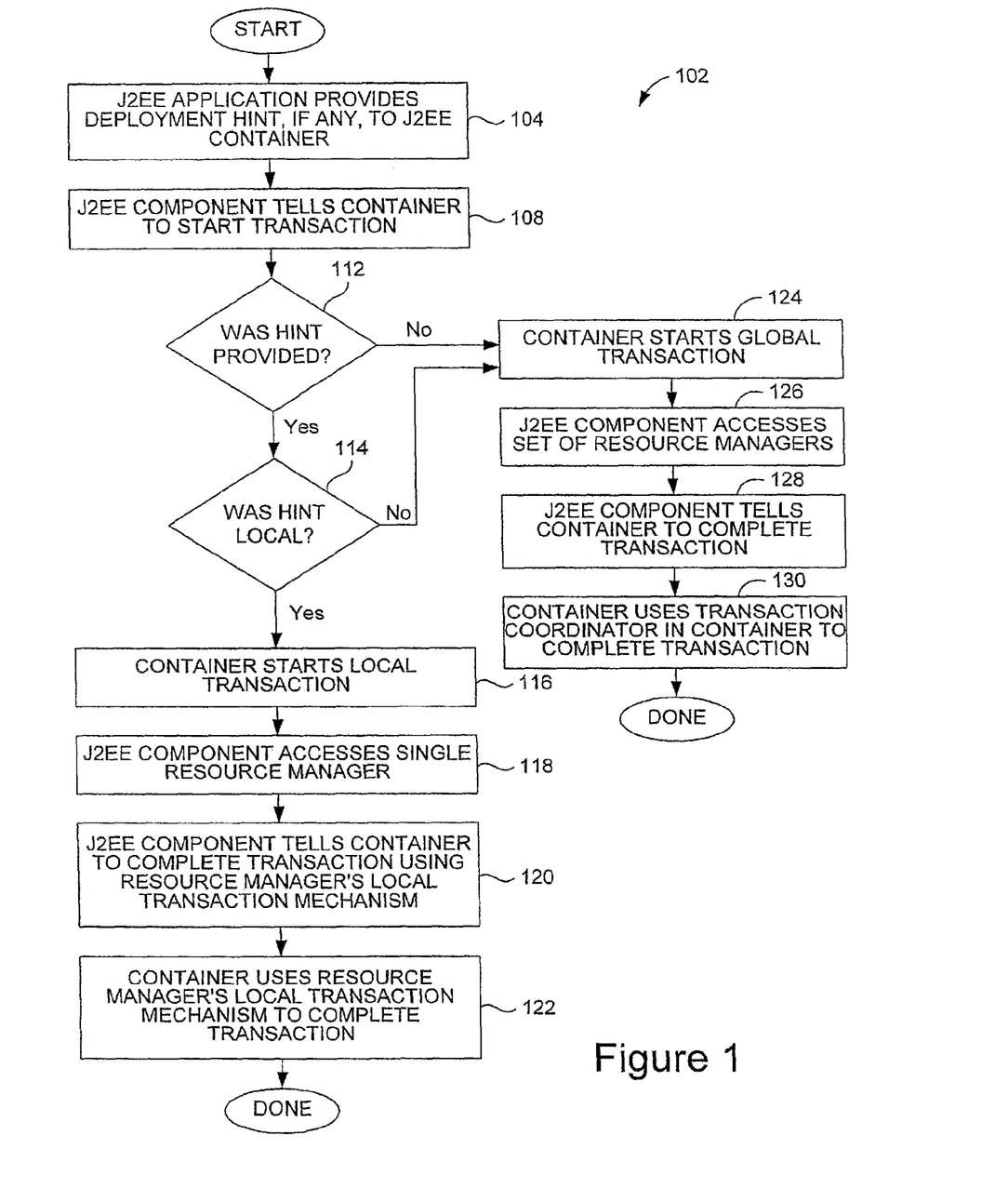
FIG. 1 is a process flow diagram which illustrates the steps associated with a conventional method of performing a transaction in an enterprise environment.

With reference to FIG. 1, one conventional method for performing transactions in an enterprise environment, e.g., J2EE, will be described. At the beginning of a transaction process 102, when an J2EE application needs access to a J2EE component such as an EJB, the J2EE application may provide a deployment hint to the container, i.e., the J2EE container, associated with the component in step 104. Once a deployment hint, if any, is provided, the component tells the container to start a transaction in step 108.

A determination is made in step 112 as to whether a hint was provided. In other words, it is determined whether the J2EE application provided a deployment hint to the container. If it is determined that a hint was provided, then process flow moves to step 114 in which it is determined whether the provided hint was a local hint, i.e., whether the hint indicates that the transaction is a local transaction. As previously discussed, a local transaction is generally a transaction during which a component interacts with only a single resource manager. Further, during a local transaction, the component generally may not access other components which are not included in the same container as the component.

When it is determined in step 114 that a local hint was provided, the container initiates a local transaction in step 116. During the course of the local transaction, the component accesses a single resource manager in step 118. At some point after the single resource manager is accessed, in step 120, the component effectively tells the container to complete the local transaction. Typically, the container is told to complete the transaction using the local transaction mechanism of the transaction manager. Once the component tells the container to complete the local transaction, the container uses the local transaction mechanism of the resource manager to complete the local transaction in step 122, and the process of performing a transaction is completed.

Returning to steps 112 and 114, if it is determined either that a hint was not provided or that a provided hint was not local, respectively, then the indication is that the transaction is a global. In general, a default assumption in a J2EE environment is that transactions are typically global. When it is determined that a transaction is global in either step 112 or 114, process flow moves from either step 112 or 114 to step 124 in which the container initiates a global transaction. During a global transaction, multiple resource managers are typically accessed in step 126.

After a set of resource managers are accessed, the component may request that the container complete the global transaction in step 128. Accordingly, the container uses its transaction coordinator to complete the global transaction in step 130, and the process of performing a global transaction is completed.

It has been observed that the majority, e.g., approximately 95 percent, of transactions in a J2EE environment are local. Hence, having the container start a global transaction by default if a deployment hint is not provided often wastes computational resources which could otherwise be allocated for other uses. Specifically, starting local transactions uses less overhead than starting global transactions. As a result, having a container start a global transaction when a transaction is more likely than not to be a local transaction often wastes computational resources, due at least in part the fact that the transaction that is started is likely to be a local transaction, and not a global transaction. Processing a local transaction as a global transaction is also typically inefficient.

Figure 2:
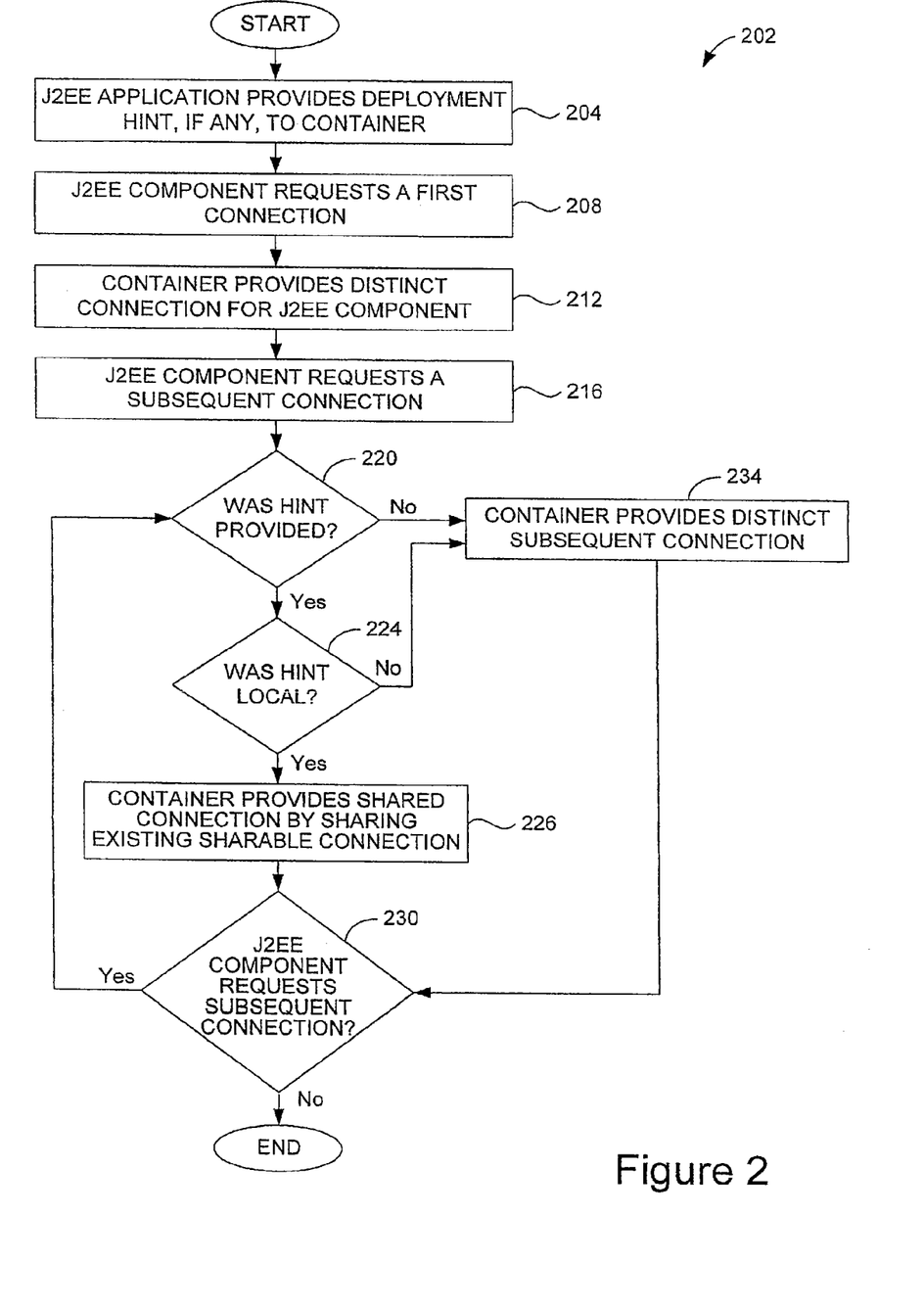
FIG. 2 is a process flow diagram which illustrates the steps associated with a conventional method of providing a connection in an enterprise environment.

In order to enable transactions to take place, connections between J2EE components and resource managers must be made or otherwise provided. Such connections may either be shared or distinct. FIG. 2 is a process flow diagram which illustrates the steps associated with a conventional method of providing connections. A process 202 of sharing connections begins at step 204 in which a J2EE application provides a deployment hint, if any, to a container. Typically, the hint provided in the context of connection sharing is the same hint provided with regards to a local transaction. In step 208, a J2EE component accessed by the J2EE application, and contained within the container, requests a first connection, i.e., a connection to a resource manager. The request is made through the container to which any existing or suitable deployment hint was provided. In response to the request for a connection, the container provides a distinct connection to the resource manager in step 212. A subsequent connection is requested by the J2EE component in step 216.

Once a request is made for a subsequent connection, a determination is made in step 216 as to whether a deployment hint was provided to the container. If it is determined that a deployment hint was provided to the container, then a determination is made in step 224 regarding whether the provided hint was a local hint. That is, it is determined if the hint indicates that the new connection is local with respect to the first connection, i.e., that the new connection is to the same resource manager as the first connection. If it is determined that the provided hint was a local hint, the container provides a shared connection by sharing an existing connection, e.g., the first connection, in step 226.

After the shared connection is provided, the J2EE component communicates with the resource manager over the shared connection. In some cases, the J2EE component may request another connection. Such a connection request may be a request for a connection to the same resource manager, or a request for a connection to a different resource manager. A determination is made in step 230 as to whether the J2EE component has requested a subsequent connection. When it is determined that the J2EE component has not requested a subsequent connection, the process of providing or implementing connections with respect to a particular J2EE component is completed.

Alternatively, if it is determined in step 230 that the J2EE component has requested a subsequent connection, the indication is that a determination should then be made regarding whether the requested subsequent connection should be a distinct connection or a shared connection. Accordingly, process flow returns from step 230 to step 220 where it is determined whether a hint was provided.

If the determination in step 220 is that no hint was provided, an assumption is typically made that a distinct subsequent connection is required. In other words, an assumption is made that a "default" connection is a distinct connection, or that unless a local hint is provided, a connection is not to be shared. As such, process flow moves from step 220 to step 234 in which the container provides a distinct subsequent connection. Once the distinct subsequent connection is provided, a determination is made in step 230 regarding whether the J2EE component requests yet another subsequent connection.

Returning to step 224 and the determination of whether a hint is a local hint, it should be appreciated that, often, if a hint is provided, a hint is a local hint. In such a case, a determination of whether a hint is a local hint may be eliminated. However, when a determination is made as to whether a hint is a local hint, if it is determined that a hint is not a local hint, then the implication is that the hint is such that the subsequent connection must be distinct. Therefore, process flow moves from step 224 to step 234 in which the container provides a distinct subsequent connection. After the connection is provided, a determination is made in step 230 as to whether the J2EE component requests another subsequent connection.

Connections are often shareable. However, unless a hint is provided by a J2EE application that informs a container that a connection may be shared, connections are maintained as distinct connection. Since hints are not always available, many connections which are sharable are effectively maintained as unshared connections. Not sharing connections which are sharable is generally inefficient, as the overhead associated with providing and maintaining the distinct connections is significant. Eliminating the overhead associated with providing and maintaining effectively unnecessary distinct connections by substantially always sharing connections which are sharable would increase the efficiency with which transactions which use the connections may be performed. Specifically, the overall performance associated with a J2EE application which uses the shared connections may be improved.

Therefore, what is desired is an efficient method and apparatus for performing local transactions and for sharing connections is desired. Specifically, what is needed is an efficient method and an apparatus for substantially preventing global transactions from being started when transactions are actually local and for enabling connections to be shared when connections are sharable.

SUMMARY OF THE INVENTION

The present invention relates to improving the overall performance of a system which processes transactions and provides connections in an enterprise environment. Starting local, instead of global, transaction essentially by default reduces the amount of overhead associated with transaction processing, thereby increasing the performance of an overall system. According to one aspect of the present invention, a method for processing a transaction in an enterprise environment includes receiving a request to start the transaction, storing information which indicates that the request to start the transaction was received, and accessing a first resource manager associated with the transaction. Typically, a container receives the request to start a transaction from a component such as an enterprise bean. Once the first resource is accessed, the transaction is initiated as a local transaction on the first resource manager, and, eventually, the transaction is completed. In one embodiment, completing the transaction includes using a local transaction mechanism of the first resource manager to complete the local transaction.

In another embodiment, the method further includes initiating a global transaction after initiating the transaction as the local transaction, and completing both the local transaction and the global transaction substantially atomically using a 2-phase commit optimization. In such an embodiment, completing both the local transaction and the global transaction substantially atomically includes using the local transaction as a last resource in the 2-phase commit protocol.

According to another aspect of the present invention, an method for implementing connections in an enterprise environment includes receiving a first request for a first connection between a component and a resource, providing the first connection between the component and the resource, and receiving a second request for a connection associated with the component. Upon receiving the second request for a connection, a determination may be made as to whether the first connection is sharable. When it is determined that the first connection is sharable, the method includes providing the first connection in response to the second request. Alternatively, when it is determined that the first connection is not sharable, the method includes providing a second connection in response to the second request. Enabling connections to be shared allows connections to be utilized in a relatively efficient manner.

In one embodiment, the method also includes receiving a subsequent request for a subsequent connection associated with the component, determining whether the first connection is sharable, and providing the first connection in response to the subsequent request when it is determined that the first connection is sharable. In such an embodiment, the method may further include determining whether the second connection is sharable, and providing the second connection in response to the subsequent request when it is determined that the second connection is sharable.

According to still another aspect of the present invention, a method for processing a transaction in an enterprise environment includes receiving a request from a component to start the transaction, and storing information which indicates that the request to start the transaction was received. A request for a first connection, which is associated with a first resource, is received from the component. The method also includes providing a connection substantially between the first resource and the component, initiating the transaction as a local transaction on the first connection, and completing the transaction.

In one embodiment, the method includes receiving a request for a subsequent connection, determining whether the subsequent connection is sharable, determining whether the first connection is sharable, and determining whether the subsequent connection is associated with the first resource. If all determinations are positive or affirmative, the method also include providing the first connection as the subsequent connection and sharing the local transaction. In such an embodiment, when it is determined that at least one of the determinations is not positive, the method may include providing a first distinct connection as the subsequent connection, and initiating a global transaction on the distinct connection.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In general, an overwhelming majority of transactions in a Java 2 Enterprise Environment (J2EE) are local. That is, the most transactions in an enterprise environment do not access more than one resource manager. As such, having a container start global transactions by default if a deployment hint which identifies transactions as local is not provided by a J2EE application often wastes computational resources which could otherwise be allocated for other uses. For applications which deal with a single resource manager, it is generally unnecessary to use the overhead associated with initiating a global transaction when a resource manager specific local transaction may be used to achieve better overall performance for a system. However, the identification of whether a transaction, e.g., a bean-managed or container-managed transaction, uses more than a single resource manager is often difficult, unless a deployment hint is provided.

Likewise, multiple connections may be acquired as a part of a transaction. Often, these multiple connections point to the same resource manager, as many connections are typically local and only deal with a single resource manager. As such, not sharing connections which point to the same resource manager as part of a transaction may unnecessarily cause a system to incur overhead associated with creating and acquiring new, distinct connections.

Enabling local transactions to be started instead of global transactions would generally serve to increase the efficiency with which an overall system may run, as transactions are typically local, and starting transactions as local transactions avoids the overhead associated with starting global transactions. Specifically, in one embodiment, a J2EE container may start a transaction as a local transaction in the case of bean-managed and container-managed transactions, irregardless of whether it is known if the transaction uses more than a single resource manager at the time the transaction is started. Such an optimization, i.e., starting transactions as local transactions, results in better performance of an overall system within the enterprise environment.

Making an assumption that connections are potentially shared enables multiple connections acquired by an application for used with a single resource manager to be substantially shared, e.g., such that a J2EE component accessed by the application may have a single shared connection with the resource manager. The sharing of connections allows efficient usage of resources, and essentially avoids the overhead associated with the acquisition of new connections.

Figure 3:
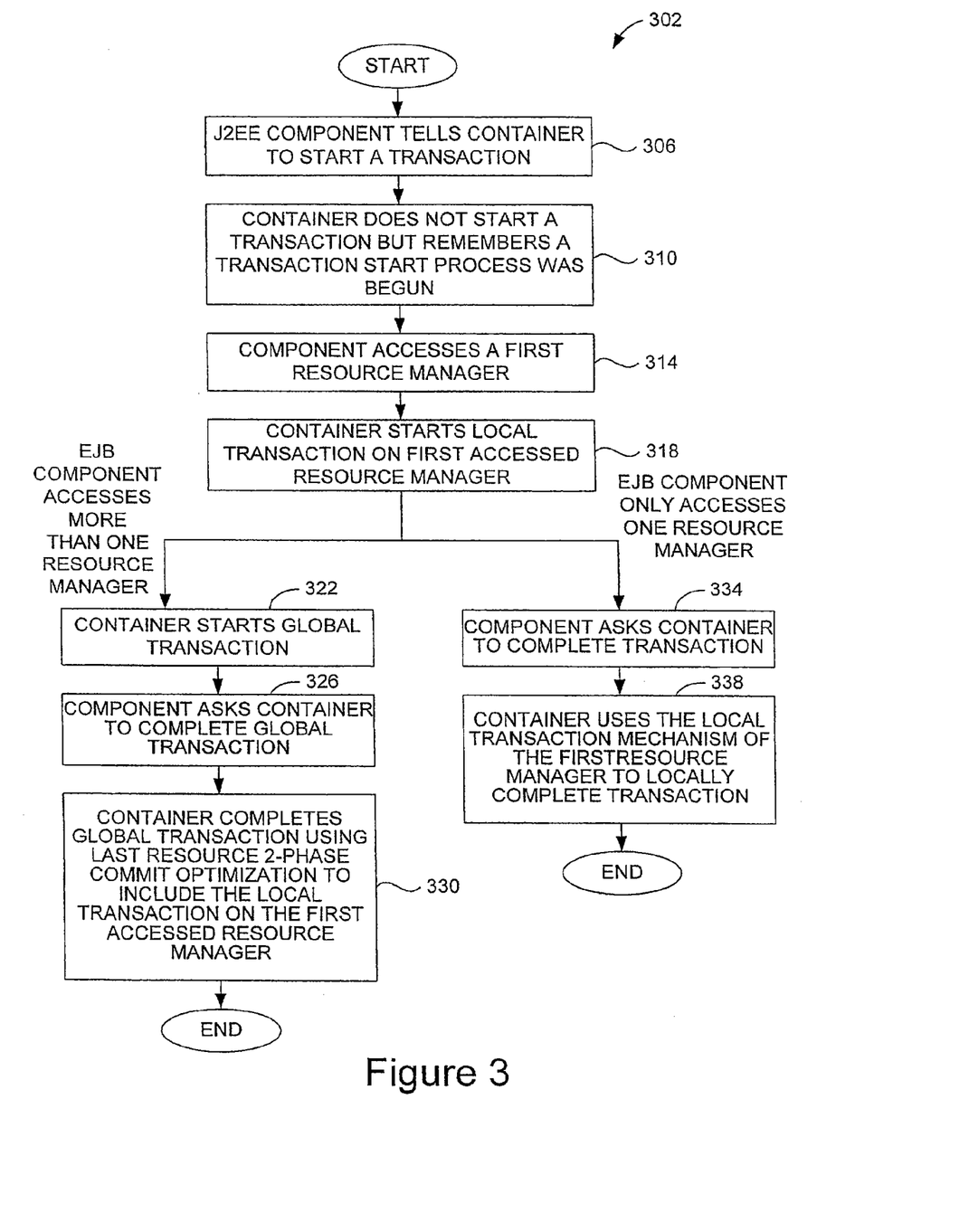
FIG. 3 is a process flow diagram which illustrates the steps associated with performing a transaction in an enterprise environment in accordance with an embodiment of the present invention.

With reference to FIG. 3, one process of performing a transaction in an enterprise environment will be described in accordance with an embodiment of the present invention. A process 302 begins at step 306 in which a J2EE component, as for example an EJB component, tells, or otherwise sends a request to, a container to start a transaction, which may either be local or global. In step 310, the container does not start a transaction but, instead, remembers that a start process was begun on a transaction.

After the container remembers that a transaction start process was begun, the component accesses a first resource manager in step 314. That is, the component accesses the first resource manager to which access would be required to perform the requested transaction. Once the first resource manager is accessed, the container starts a local transaction on the first accessed resource manager in step 318.

It should be appreciated that at some point after the local transaction has begun, a lazy decision may be made as to whether the component accessed only the first resource manager of more than one resource manager. In other words, there is effectively no "active" determination of whether additional resource managers are accessed. If the component accesses more than one resource manager, which is generally not a common case, then process flow moves from step 318 to step 322 in which the container starts a global transaction with respect to substantially all subsequently accessed resource managers, i.e., substantially all resource managers but the first resource manager. Typically, the global transaction occurs while the local transaction started in step 318 is still occurring.

The component asks the container to complete the global transaction in step 326. In response to the request to complete the global transaction, the container completes the global transaction in step 330. While substantially any suitable method may generally be used by the container to complete the global transaction, in one embodiment, the container completes the global transaction using a last resource 2-phase commit optimization, which will be discussed below with reference to FIG. 4*a*, and is described in detail in *Transaction Processing: Concepts and Techniques* by Jim Gray and Andreas Reuter (ISBN 1-55860-190-2), which is incorporated herein by reference in its entirety. Specifically, the local transaction on the first accessed resource manager is included in the 2-phase commit optimization to enable both the global transaction and the local transaction to be completed atomically, as will be described below with reference to FIG. 4*b*. Once the global transaction and the local transaction are completed, then the process of performing a transaction is completed.

In the event that the component only accesses the first resource manager, and does not access any other resource managers, which is generally a common case, then rather than proceeding from step 318 to step 322, process flow moves from step 318 to step 334 in which the component asks the container to complete the transaction, i.e., the local transaction. The container uses the local transaction mechanism of the first accessed resource manager in step 338 to locally complete the transaction. Once the transaction is completed locally, the process of performing a transaction is completed.

Figure 4A:
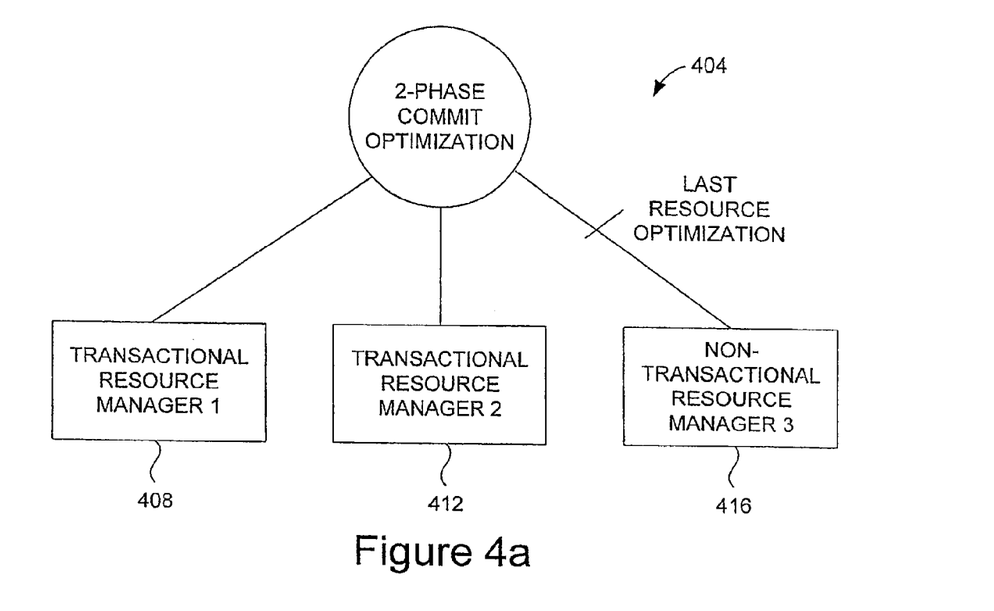
FIG. 4a is a diagrammatic representation of a last resource 2-phase commit optimization.

As mentioned above with respect to FIG. 3, a local commit optimization technique such as a last resource 2-phase commit optimization with a local transaction as a last agent enables both a local transaction and a global transaction to be completed substantially atomically. In the event that the last resource 2-phase commit optimization fails, then neither the local transaction or the global transaction are completed, e.g., the optimization "backs off" unless the local transaction and the global transaction may both be committed. A last resource 2-phase commit optimization enables a J2EE application to effectively gain better performance for applications which use a single resource manager, and preserves transaction semantics when multiple resource managers may be involved in a transaction. FIG. 4*a* is a diagrammatic representation of a 2-phase commit operation. In general, a 2-phase commit operation 404 is used to commit transactional resource managers 408, 412 and a non-transactional resource manager 416 substantially atomically. Specifically, a non-transactional resource manager 416 is used as the last resource in a last resource 2-phase commit optimization, which is effectively a combination of a 2-phase commit protocol and a last resource optimization.

Figure 4B:
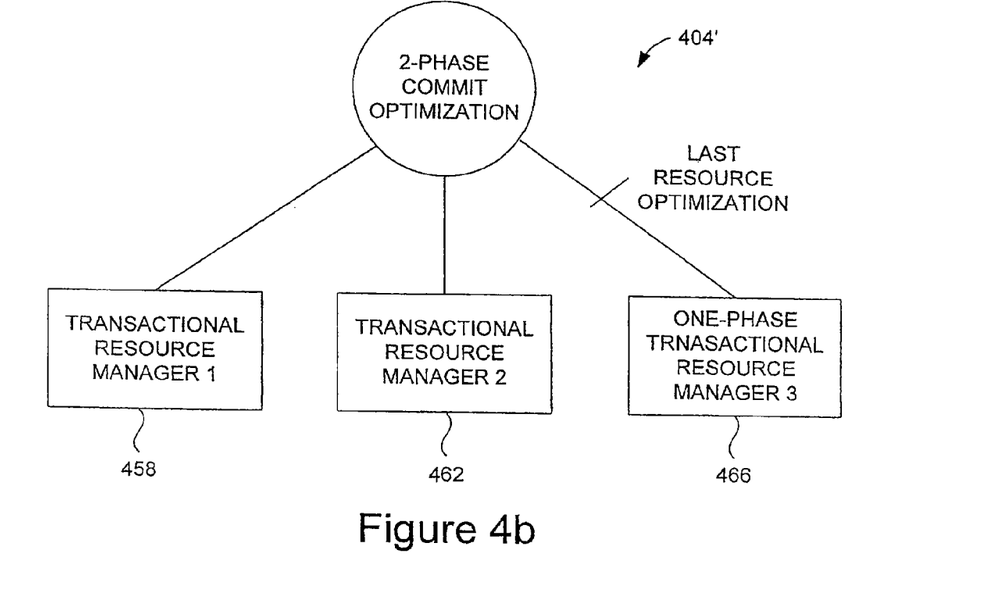
FIG. 4b is a diagrammatic representation of a last resource 2-phase commit optimization in accordance with an embodiment of the present invention.

In one embodiment, last resource 2-phase commit optimization 404 is not used to commit a non-transactional resource manager but is, instead, used to commit a one-phase transactional resource manager. That is, last resource 2-phase commit optimization 404 may be used to commit a global transaction and a local transaction substantially atomically. With reference to FIG. 4*b*, a last resource 2-phase commit optimization will be described in accordance with an embodiment of the present invention. A last resource 2-phase commit optimization 404' may be used to commit resource managers associated with global transactions, i.e., resource managers 458 and 462, and a resource manager associated with a local transaction, i.e., resource manager 466. Although only two resource managers 458 and 462 have been shown as being associated with global transactions, it should be appreciated that 2-phase commit protocol 404' may generally be arranged to include any number of resource managers, e.g., less than two or more than two, that are associated with global transactions.

Typically, 2-phase commit protocol 404' includes two phases, namely a "prepare" phase and a "commit or rollback" phase. During the prepare phase, for a system in which two resource managers 458 and 462 are associated with global transactions, a prepare message is sent to resource manager 458 by a transaction coordinator. If resource manager 458 is prepared to commit, e.g., end its associated global transaction, resource manager 458 replies affirmatively. Otherwise, resource manager would respond in the negative. It should be understood that until all resource managers 458, 462, and 466 are prepared to commit, the global and local transactions are not ended.

After an affirmative message has been received from resource manager 458, a prepare message is sent to resource manager 462. If resource manager 462 is prepared to commit, resource manager 462 replies affirmatively. A log is then created which indicates that a commit message is being sent to resource manager 466, at which point a commit message is sent to resource manager 466. Resource manager 466 then typically commits. A log of the prepare vote, i.e., the responses of resource managers 458 and 462 is prepared to effectively end the prepare phase of 2-phase commit protocol 404'.

The commit or rollback phase of 2-phase commit optimization 404' begins with a determination of whether the log of the prepare vote indicates that resource managers 458 and 462 are prepared. If resource managers 458 and 462 are prepared, and if resource manager 466 is committed, then commit messages are sent to resource managers 458 and 462, and a log is created which indicates that resource managers 458, 462, and 466 are all committed. If at least one of resource managers 458 and 462 is not prepared, then a roll back occurs to effectively "uncommit" resource manager 466.

It is possible that a crash may occur which involves the container associated with resource manager 466 while 2-phase commit optimization 404' is in progress. In order to ensure that either all resource managers 458, 462, and 466 are committed, or none of resource managers 458, 462, and 466 are committed, a record may be inserted into a separate table, by the container using the same connection as part of the local transaction, which indicates the status of the phases of 2-phase commit optimization 404'. Such a record may log when a commit message is sent to resource manager 466, and when resource manager 466 has completed a commit operation. If such a record exists, then the record may be used to identify whether a new commit message should be sent to resource manager 466, or whether resource manager 466 is already committed, for example, during crash recovery processing.

Figure 5:
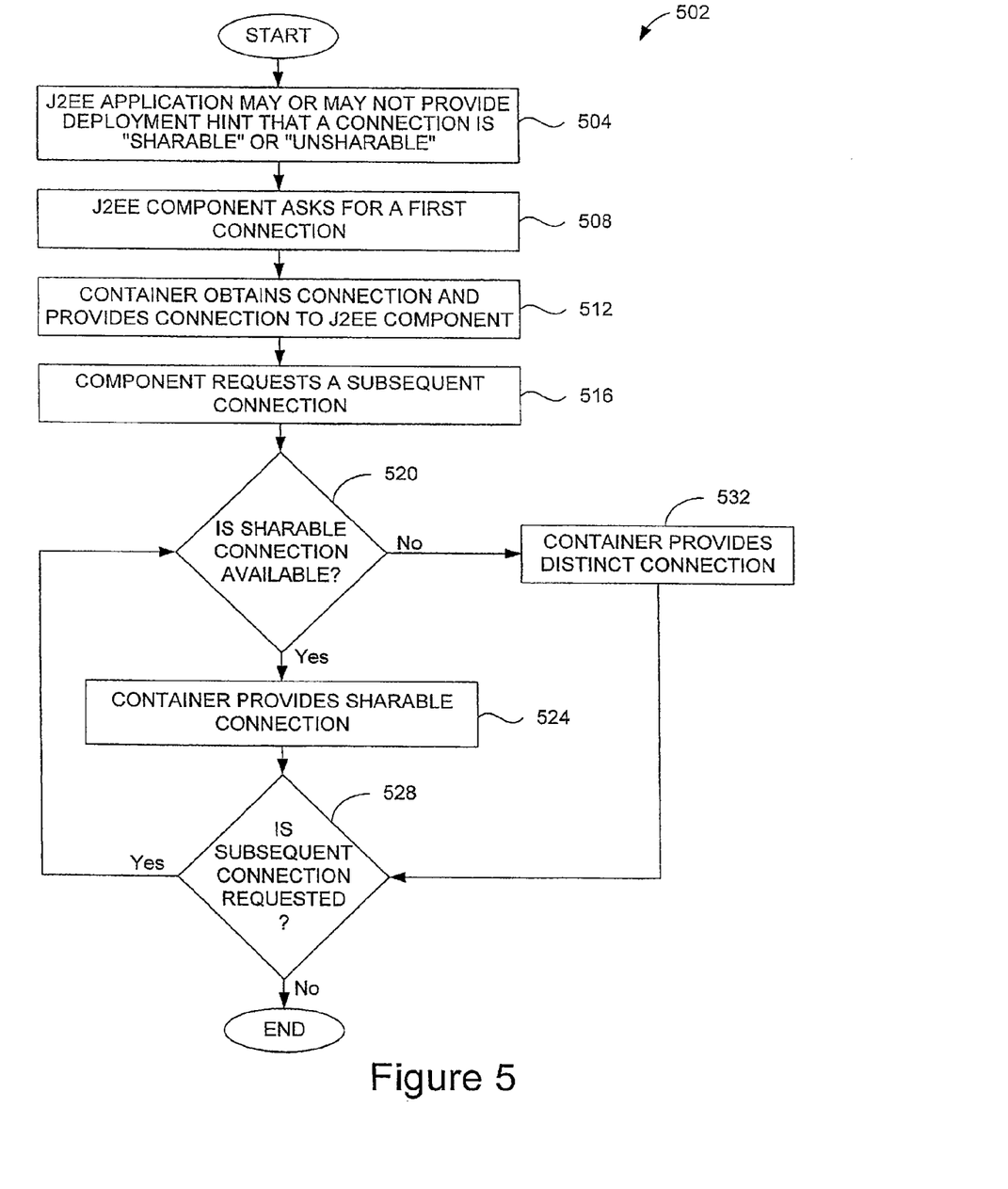
FIG. 5 is a process flow diagram which illustrates the steps associated with providing a connection in accordance with an embodiment of the present invention.

FIG. 5 is a process flow diagram which illustrates the steps associated with providing connections in accordance with an embodiment of the present invention. A process 502 of providing connections to a component begins at step 504 in which an J2EE application may or may not provide a deployment hint to a container. Specifically, the J2EE application may optionally provide a hint to a container that a connection is either sharable or unsharable. Whether or not a hint is provided, a component within the container, e.g., a J2EE component such as an BIB component, requests a first connection to a resource manager in step 508. In general, the request is made to the container in which the component is contained.

Once a request for a connection is made, the container obtains an available connection and provides the connection to the component in step 512. It should be understood that substantially any suitable method may be used to obtain and provide a connection to the component. In the described embodiment, after a connection is provided to the component, the component makes a request for a subsequent connection in step 516.

A determination is made in step 520 as to whether a sharable connection is available. In general, a determination of whether a sharable connection is available may be made using substantially any suitable manner. By way of example, if a deployment hint is provided by the J2EE application in step 504, the hint may be used to determine whether or not a connection is sharable. In the described embodiment, if connections associated with a J2EE application are not sharable, then the J2EE application will provide a deployment hint, i.e., to an appropriate container. That is, if no deployment hint was provided in step 504, connections are assumed to be sharable.

Connections which use the same resource manager are generally assumed to be shareable. If no deployment hint is provided, an implicit hint that a connection is sharable may be assumed. If an explicit deployment hint is provided, the deployment hint may indicate that either a connection is sharable or unsharable. Accordingly, the container acts appropriately depending upon the explicit deployment hint. It should be appreciated, however, that in some cases, two connections to the same resource manager may be unsharable due to the manner in which connections are used by the associated application. In such cases, the application may mark the connections as unsharable, since the container substantially always assume that connections are sharable unless otherwise indicated.

If it is determined in step 520 that a sharable connection is available, the container provides the sharable connection to the component in step 524 in response to the request for a connection. After the shared connection is provided, a determination is made in step 528 as to whether a subsequent connection is requested by the component. When the determination is that a subsequent connection was requested, process flow returns to step 520 in which it is determined whether a suitable sharable connection is available. Alternatively, when the determination is that a subsequent connection is not requested, the process of providing connections is completed.

Returning to step 520 and the determination of whether a sharable connection is available, if it is determined that a sharable connection is not available, then the container provides a distinct connection in response to the request for a subsequent connection in step 532. Once the subsequent connection is provided, a determination is made in step 528 as to whether yet another subsequent connection is requested.

Generally, assuming that connections are sharable unless deployment hints are provided enables most connections to be shared, thereby eliminating the overhead associated with providing distinct connections when distinct connections are not necessary. Most connections are generally sharable, as transactions which use connections typically access only one resource manager and, hence, may use substantially only one connection between a component and a resource manager.

In one embodiment, the transaction processing described above with respect to FIG. 3 may be intermingled with the process of providing connections discussed above with respect to FIG. 5. More generally, transaction processing often involves issues associated with providing connections. As will be appreciated by those skilled in the art, transaction processing typically involves providing and maintaining connections between components and resource managers. Therefore, effectively combining an efficient method for transaction processing with an efficient method for providing connections may further increase the overall performance of a system operating in J2EE.

Figure 6A:
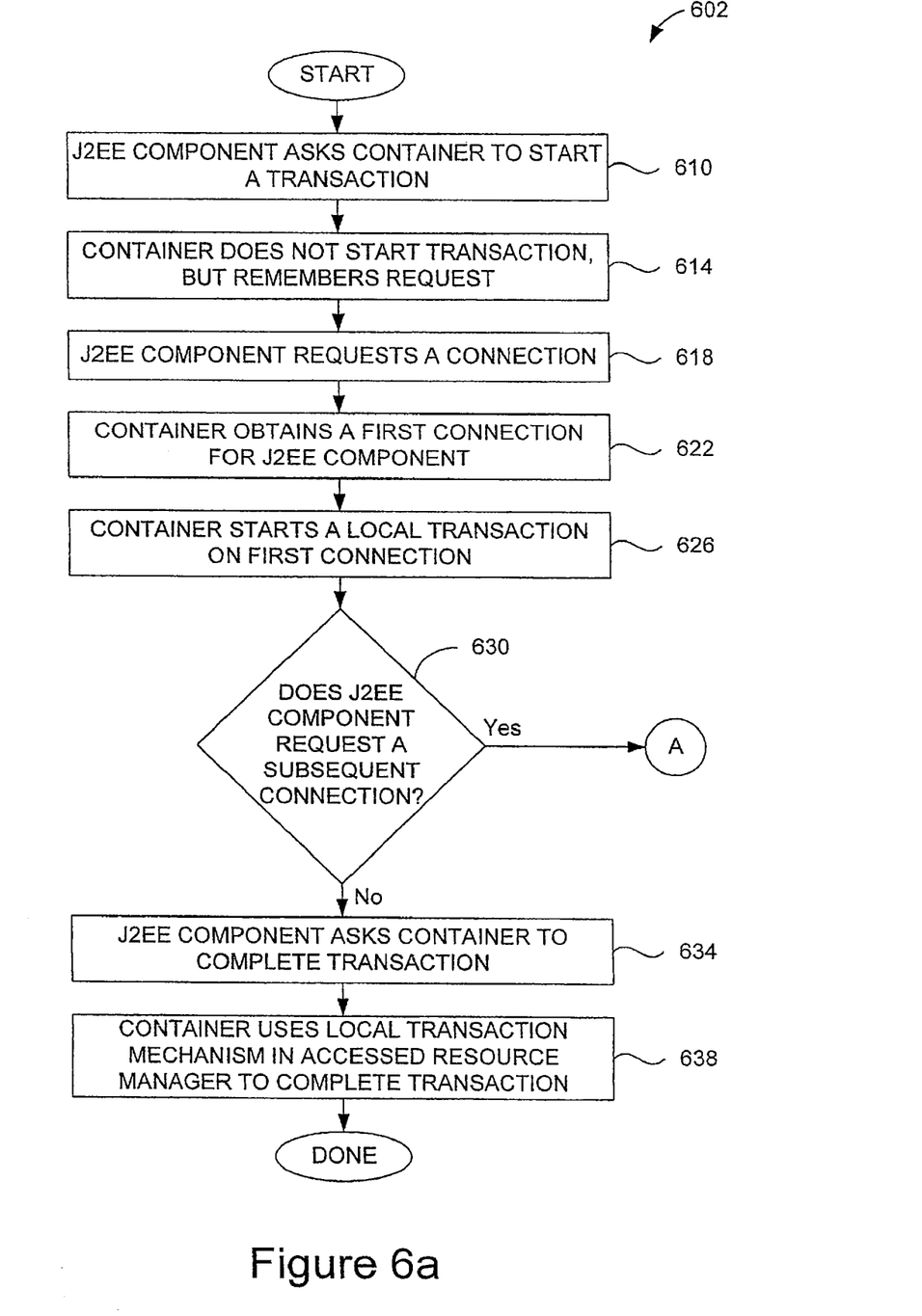
FIGS. 6a and 6b are a process flow diagram which illustrates the steps associated with performing a transaction that involves providing a connection which accounts for sharable connections in accordance with an embodiment of the present invention.
Figure 6B:
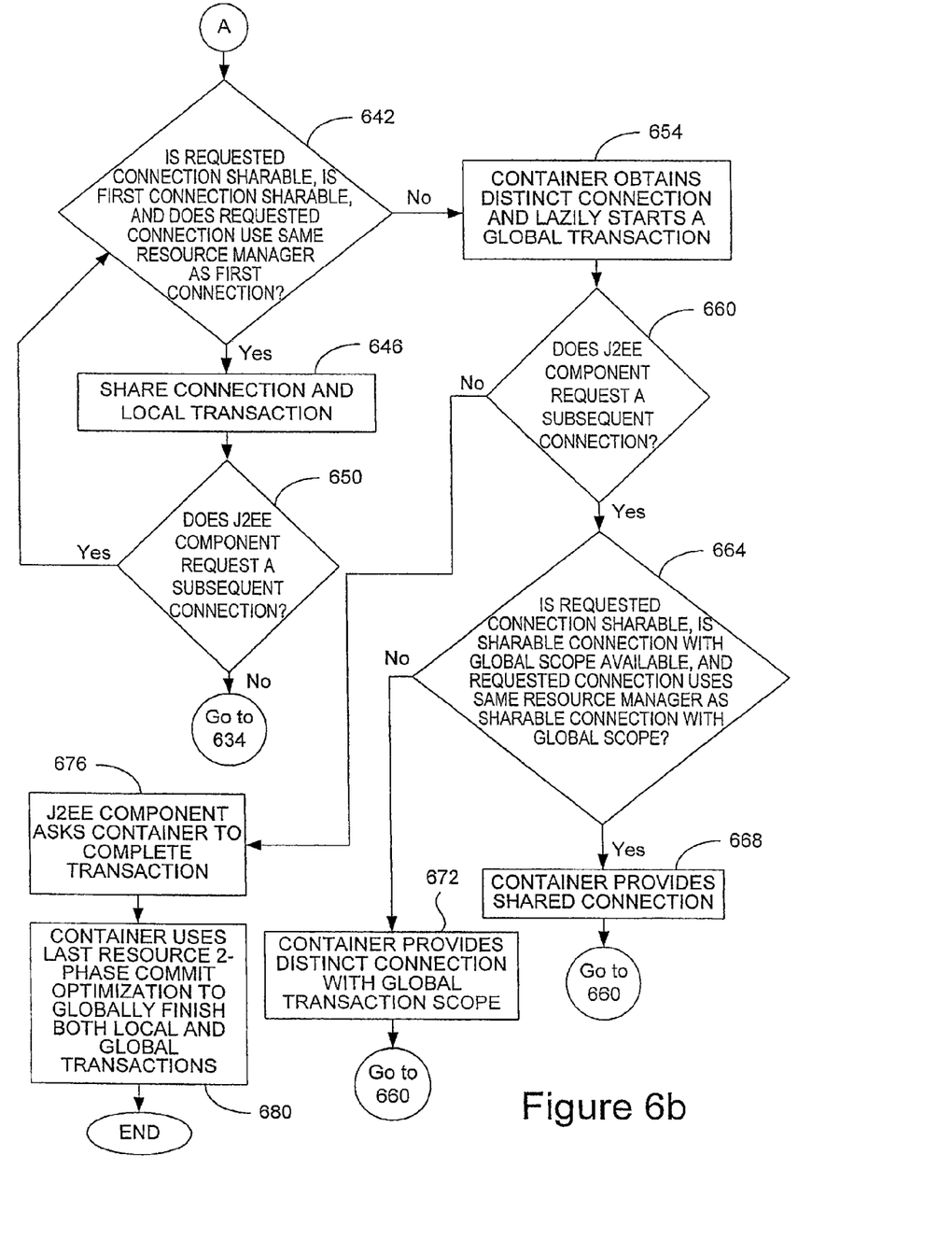

With reference to FIGS. 6a and 6b, one method of processing transactions which includes connection sharing will be described in accordance with an embodiment of the present invention. A method 602 of processing transactions begins at step 610 in which a J2EE component requests that a container start a transaction. Upon receiving the request, the container does not start a transaction in step 614 but, instead, remembers that a request has been made to start a transaction.

In step 618, the component requests a connection, e.g., a connection to a resource manager. Typically, the component requests a connection from the container in which the component is contained. The container obtains a first connection for the component in step 622, and proceeds to start a local transaction on the first connection in step 626. Once the local transaction has been started by the container on the first connection, a determination is made in step 630 as to whether the component requests a subsequent connection. If it is determined that the component does not request a subsequent connection, the component asks the container to complete the transaction in step 634. The container then proceeds to use the local transaction mechanism of the accessed resource manager, i.e., the resource manager to which the connection was made, to complete the transaction in step 638. When the transaction is completed, the method of processing transactions is completed.

Alternatively, if the determination in step 630 is that the component does request a subsequent connection, a determination is made in step 642 regarding whether the requested connection is sharable, whether the first connection is sharable, and if the requested connection uses the same resource manager as the first connection. When it is determined that both the requested connection and the first connection are sharable and, further, that the requested connection uses the same resource manager as the first connection, the indication is that an existing connection, i.e., the first connection, may be shared. Accordingly, process flow proceeds from step 642 to step 646 where the first connection is shared, as well as the local transaction.

After the first connection and the local connection are shared, a determination is made in step 650 regarding whether the component requests a subsequent connection. If the component requests a subsequent connection, process flow returns to step 642 and a determination of whether the requested connection may ultimately share the first connection and the local transaction. On the other hand, if the component does not request a subsequent connection, then process flow returns to step 634 in which the component asks the container to complete the local transaction.

Returning to step 642, if it is determined that the requested connection is not shareable, or that the first connection is not sharable, or that the requested connection does not use the same resource manager as the first connection, then the indication is that the requested connection may not share the first connection and the local transaction started in step 626. As such, process flow moves from step 642 to step 654 in which the container obtains a distinct connection and lazily starts a global transaction. The global transaction may lazily start when a transaction is exported from one container to another, or when a different resource manager than the resource manager associated with the first connection is accessed as part of a transaction.

Once the global transaction has been started in step 654, a determination is made in step 660 regarding whether the component requests a subsequent connection. In the event that the component requests a subsequent connection, a determination is effectively made in step 664 as to whether the distinct connection obtained in step 654 may share an existing connection and an existing global transaction. Specifically, it is determined in step 664 if the requested connection is sharable, if a sharable connection with a global transaction scope is available, and if the requested connection uses the same resource manager as the sharable connection with the global scope. When it is determined that the requested connection is sharable, that a sharable connection with a global scope is available, and that the requested connection uses the same resource manager as the sharable connection with the global scope, then the container provides a suitable shared connection to the component in step 668. In other words, an existing connection with a global scope, as well as an associated global transaction, are shared. After the shared connection is provided, process flow returns to step 660 in which it is determined whether the component requests another connection.

Returning to step 664, if it is determined that either the requested connection is not sharable, that no suitable sharable connection with a global scope is available, or that the requested connection does not use the same resource manager as a sharable connection with a global scope, then the container provides a distinct connection with a global transaction scope in step 672. Once the distinct connection is provided, process flow returns to step 660 in which it is determined whether the component requests another connection.

If the determination in step 660 is that the component does not request a subsequent connection, the indication is that the local transaction started in step 626 and the global transaction started in step 654 are to be completed. Accordingly, if no subsequent connection is requested, the component asks the container to complete both the local and global transactions in step 676. In response to the request to complete the transactions, in the described embodiment, the container uses a last resource optimization, i.e., a last resource 2-phase commit optimization, to globally finish both the local and global transactions in step 680. The use of the last resource optimization was described above with respect to FIGS. 4a and 4b. Once the local and global transactions are finished, the processing of transactions is completed.

Figure 7A:
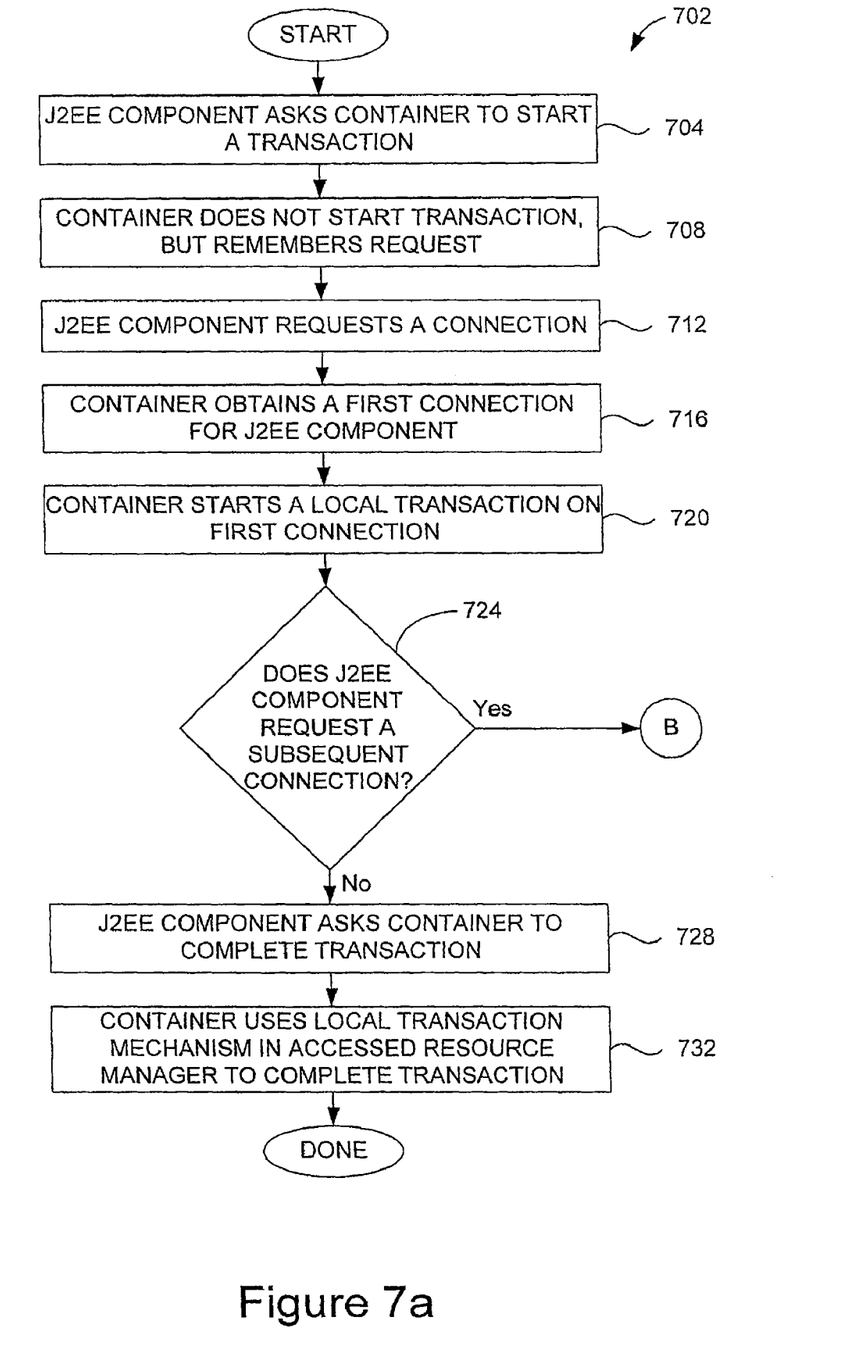
FIGS. 7a and 7b are a process flow diagram which illustrates the steps associated with performing a transaction that involves providing a connection which does not account for sharable connections in accordance with an embodiment of the present invention.
Figure 7B:
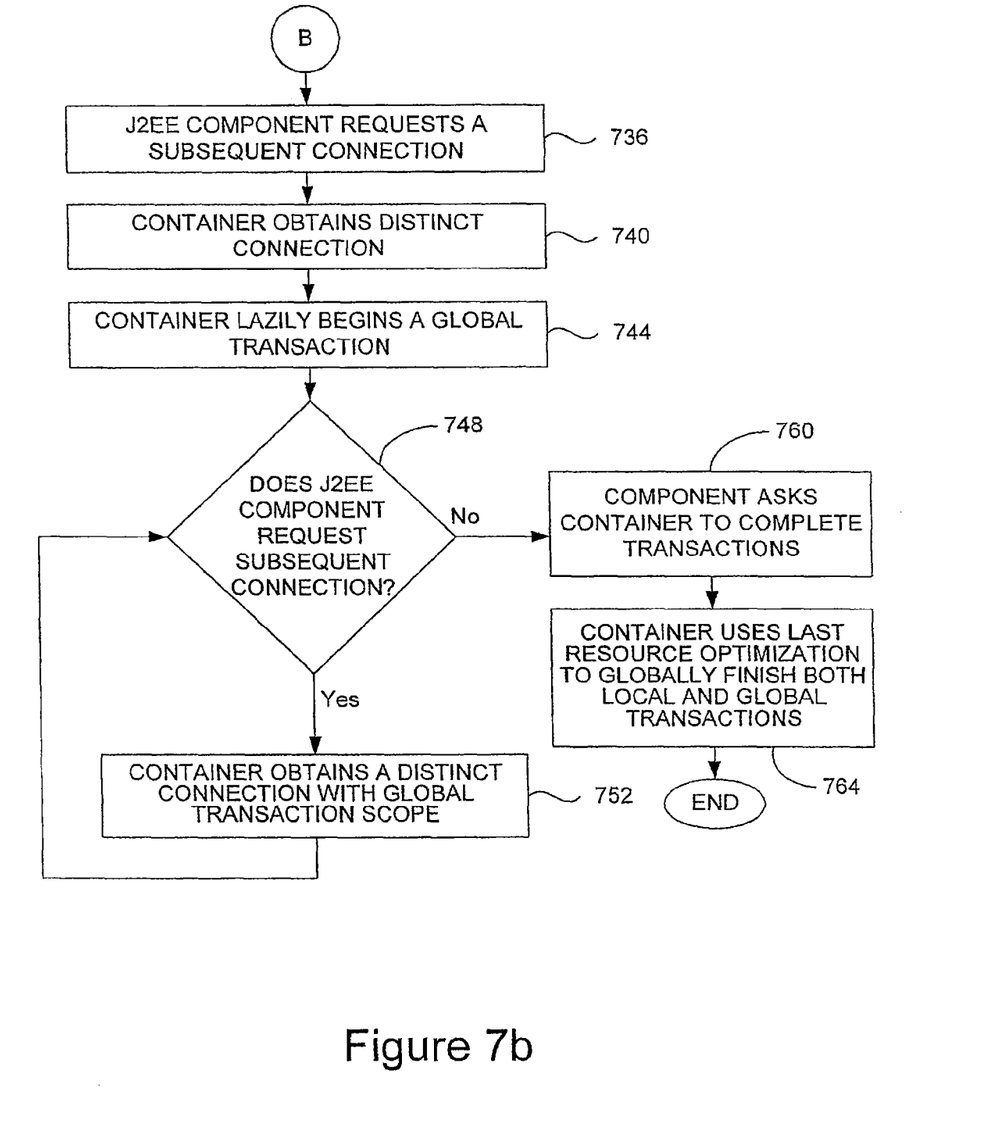

As previously mentioned, transaction processing typically involves issues associated with providing connections. By allowing transaction processing to include the implementation of shared connections, the overhead associated with transaction processing may decrease, thereby effectively increasing the efficiency with which transaction processing may occur. It should be appreciated that the transaction processing of the present invention may generally be implemented without connection sharing. FIGS. 7a and 7b are a process flow diagram which illustrates the steps associated with performing a transaction that involves providing a connection in an enterprise environment which does not account for sharable connections in accordance with an embodiment of the present invention. In other words, the method of FIGS. 7a and 7b may be considered to be a representation of the method of FIG. 3 which includes steps associated with providing and maintaining connections.

A method 702 of processing transactions begins at step 704 in which a component asks a container to start a transaction. Rather than start a transaction substantially immediately, in step 708, the container remembers that a request has been made to start a transaction. The component requests a connection such as a connection to a resource manager in step 712. In response to the request for a connection, the container obtains a first connection for the component in step 716, and starts a local transaction on the first connection in step 720. After the local transaction has been started by the container on the first connection, it is determined in step 724 whether the component requests a subsequent connection. If it is determined that the component does not request a subsequent connection, the component asks the container to complete the transaction in step 728. The container completes the transaction by using the local transaction mechanism of the accessed resource manager, i.e., the resource manager to which the connection was made, to complete the transaction in step 732. Once the local transaction is completed, the method of processing transactions is completed.

Alternatively, if the determination in step 724 is that the component requests a subsequent connection, the component requests a subsequent connection in step 736. In response to the request for a subsequent connection, the container obtains a distinct connection for the component in step 740, and lazily begins a global transaction in step 744. It should be appreciated that the global transaction and the local transaction started in step 720 are both effectively "active" at the same time. That is, both the global transaction and the local transaction are essentially both be in progress.

After the global transaction is started in step 744, a determination is made in step 748 as to whether the component requests a subsequent connection. If it is determined that the component does not request a subsequent connection, the component asks the container in step 760 to complete the transactions, i.e., the local and global transactions. Then, the container uses a last resource optimization in step 764 to globally finish both the local transaction and the global transaction. Once the local and global transactions are completed, the processing of transactions is completed.

Returning to step 748 in which a determination is made as to whether the component requests a subsequent connection, if it is determined that a subsequent connection is requested, process flow proceeds to step 752 in which the container obtains a distinct connection with a global transaction scope. After the distinct connection is obtained by the container for the component, process flow returns to step 748 and the determination of whether a subsequent connection is requested.

Figure 8:
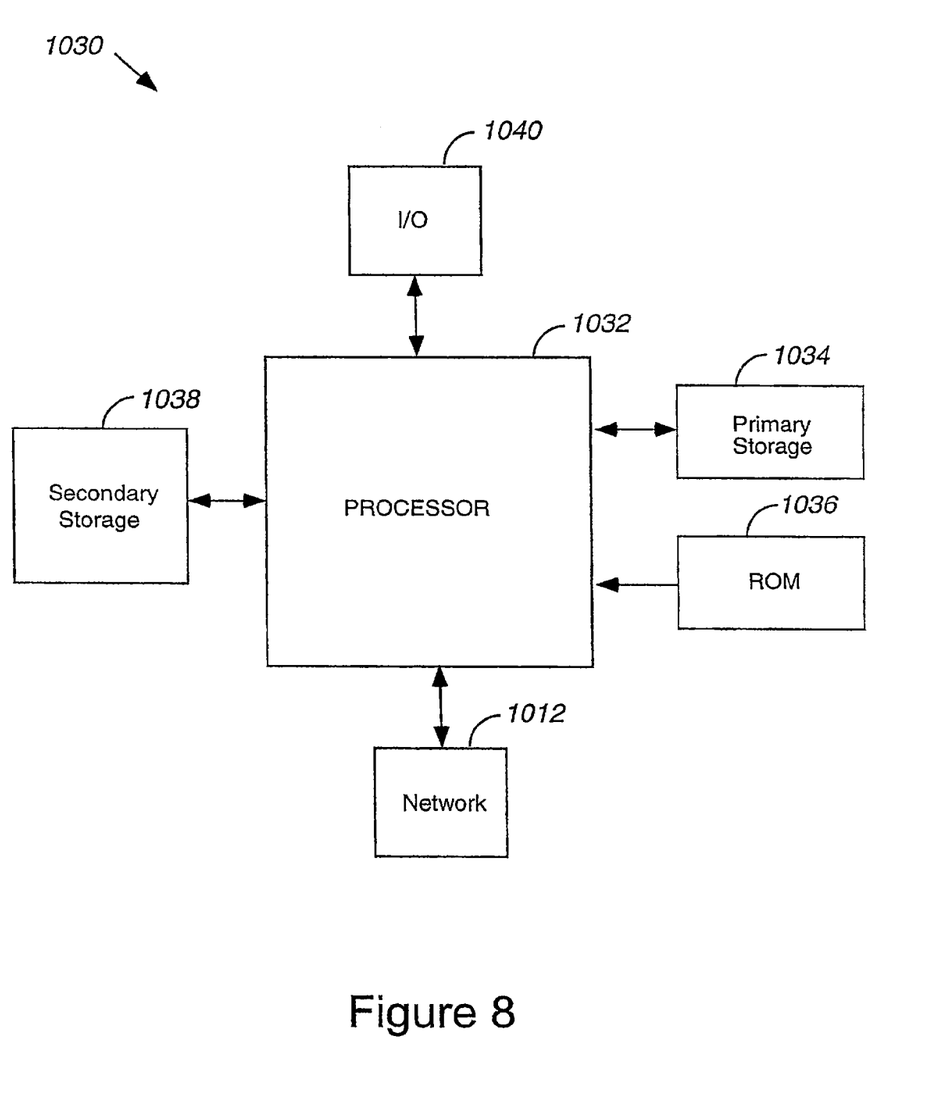
FIG. 8 is a diagrammatic representation of a general-purpose computer system which is suitable for implementing the present invention.

An enterprise environment such as J2EE may generally be implemented on any suitable computing system. FIG. 8 illustrates a typical, general-purpose computer system suitable for implementing the present invention. The computer system 1030 includes at least one processor 1032 (also referred to as a central processing unit, or CPU) that is coupled to memory devices including primary storage devices 1036 (typically a read only memory, or ROM) and primary storage devices 1034 (typically a random access memory, or RAM).

As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk, a tape, an optical disk, a floppy disk, or a computer disk read only memory (CD-ROM) which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, although the steps associated with the various processes and methods of the present invention may be widely varied. In general, the steps associated with the methods may be altered, reordered, replaced, removed, and added. For instance, determinations of whether a component requests a subsequent connection, e.g., step 630 of FIG. 6a, may be lazy determinations rather than active determinations.

While the method of connection sharing discussed above has been described as being suitable for intermingling within a connection sharing process, it should be understood that the method of connection sharing may be implemented with respect to substantially any suitable process. Similarly, the method of connection sharing that is intermingled with the method of transaction processing described above with respect to FIGS. 6a and 6b may be substantially any suitable method of connection sharing.

When a local transaction and a global transaction are effectively being processed in parallel, the local and global transactions are completed atomically, as described above. A last resource 2-phase commit optimization, as described above, may be used to complete local and global transactions atomically. In lieu of a last resource 2-phase commit optimization, substantially any suitable optimization which enables two transactions to be completed atomically may be implemented as part of a process of transaction processing.

Resource managers have generally been described as being associated with transactions and connections. It should be appreciated, however, that other enterprise resources may instead be associated with transactions and connections without departing from the spirit or the scope of the present invention. Such resources may generally include, but are not limited to, file systems, databases, and substantially any enterprise resource.

In general, global transactions have been described as transactions which access more than one resource, e.g., resource manager. The initiation of global transactions are not limited to transactions which are started when access to more than one resource is desired. By way of example, a global transaction may be started, e.g., lazily started, when a transaction includes exporting to a different container.

A J2EE component has been described as being an EJB. However, a J2EE component may be any component which is suitable for operating in J2EE or, more generally, an enterprise environment, without departing from the spirit or the scope of the present invention. Therefore, the present examples are to be considered as illustrative and not restrictive, and the invention is not to be limited to the details given herein, but may be modified within the scope of the appended claims.

What is claimed is:

1. A computer-implemented method for implementing connections in an enterprise environment, the computer-implemented method comprising:

receiving, at a container, a first request, from a component within the container, for a first connection between the component and a first resource manager, wherein the container and the component include computer executable code running on a processor, the computer executable code having been loaded into the processor from a computer readable storage medium;

providing, by the container to the component, the first connection between the component and the first resource manager;

receiving, at the container, a second request, from the component, for a connection associated with the component;

determining, by the container, if a deployment hint is received from an application, the application being arranged to substantially communicate with the component, the deployment hint indicating if the second request is for a connection to the first resource manager;

if a deployment hint is received, defining the second request as local if the deployment hint indicates that the second request is for a connection to the first resource manager, and defining the second request as global if the deployment hint indicates that the second request is not for a connection to the first resource manager;

if a deployment hint is not received, defining the second request as local;

if the second request is local, determining if the first connection is sharable;

providing, by the container to the component, the first connection in response to the second request when it is determined that the second request is local and the first connection is sharable;

providing, by the container to the component, a second connection between the component and the first resource manager in response to the second request when it is determined that the second request is local and the first connection is not sharable, wherein the second connection is distinct from the first connection; and providing, by the container to the component, a connection between the component a second resource manager when it is determined that the second request is global.

2. A computer-implemented method as recited in claim 1 further including:

receiving a subsequent request for a subsequent connection associated with the component;

determining whether the first connection is sharable; and providing the first connection in response to the subsequent request when it is determined that the first connection is sharable.

3. A computer-implemented method as recited in claim 2 further including:

determining whether the second connection is sharable; and providing the second connection in response to the subsequent request when it is determined that the second connection is sharable.

4. A computer-implemented method as recited in claim 3 further including:

providing a distinct connection in response to the subsequent request when it is determined that the first connection and the second connection are not sharable.

5. A computer-implemented method as recited in claim 3 further including:

providing a sharable connection in response to the subsequent request when it is determined that a sharable connection is available.

6. A computer-implemented method as recited in claim 2 further including:

providing a distinct connection in response to the subsequent request when it is determined that the first connection is not sharable.

7. A computer-implemented method as recited in claim 1 wherein the deployment hint is arranged to indicate whether the first connection is shareable.

8. A computer-implemented method as recited in claim 1 wherein the deployment hint is arranged to indicate whether the first connection is unshareable.

9. A computer program product for implementing connections in an enterprise environment, the computer program product comprising:

a computer-readable medium that stores computer code;

a processor connected to the computer-readable medium, the processor executing computer code received from the computer-readable medium, including:

computer code for receiving, at a container, a first request, from a component within the container, for a first connection between the component and a first resource manager;

computer code for providing, by the container to the component, the first connection between the component and the first resource manager;

computer code for receiving, at a container, a second request, from the component, for a connection associated with the component;

computer code for determining, by the container, if a deployment hint is received from an application, the application being arranged to substantially communicate with the component, the deployment hint indicating if the second request is for a connection to the first resource manager;

computer code for defining the second request as local if a deployment hint is received and if the deployment hint indicates that the second request is for a connection to the first resource manager, and for defining the second request as global if the deployment hint indicates that the second request is not for a connection to the first resource manager;

computer code for defining the second request as local if a deployment hint is not received;

computer code for determining if the first connection is sharable if the second request is local;

computer code for providing, by the container to the component, the first connection in response to the second request when it is determined that the second request is local and the first connection is sharable;

computer code for providing, by the container to the component, a second connection between the first component and the first resource manager in response to the second request when it is determined that the second request is local and the first connection is not sharable, wherein the second connection is distinct from the first connection; and computer code for providing, by the container to the component, a connection between the component a second resource manager when it is determined that the second request is global.

10. A computer program product as recited in claim 9 further including:

computer code for receiving a subsequent request for a subsequent connection associated with the component;

computer code for determining whether the first connection is sharable; and computer code for providing the first connection in response to the subsequent request when it is determined that the first connection is sharable.

11. A computer program product as recited in claim 10 further comprising:

computer code for determining whether the second connection is sharable; and computer code for providing the second connection in response to the subsequent request when it is determined that the second connection is sharable.

12. A computer program product as recited in claim 9 wherein the computer-readable medium is one selected from the group consisting of a hard disk, a floppy disk, a tape, an optical disk, a CD-ROM, and a computer memory.

13. A computer program product as recited in claim 9 wherein the deployment hint is arranged to indicate whether the first connection is shareable.

14. A computer program product as recited in claim 9 wherein the deployment hint is arranged to indicate whether the fist connection is unshareable.

* * * * *